(12) United States Patent
Howard et al.

(10) Patent No.: US 8,537,861 B2
(45) Date of Patent: Sep. 17, 2013

(54) SYSTEM FOR STACKING SIGNALS IN AN EXPANDED FREQUENCY RANGE

(75) Inventors: Daniel H. Howard, Atlanta, GA (US);
Robert L. Howald, Orlando, FL (US);
John M. Ulm, Pepperell, MA (US)

(73) Assignee: General Instrument Corporation, Horsham, PA (US)

( * ) Notice: Subject to any disclaimer, the term of this patent is extended or adjusted under 35 U.S.C. 154(b) by 330 days.

(21) Appl. No.: 12/342,635

(22) Filed: Dec. 23, 2008

(65) Prior Publication Data
US 2010/0158049 A1    Jun. 24, 2010

(51) Int. Cl.
*H04J 1/00*    (2006.01)
(52) U.S. Cl.
USPC .......................................................... 370/480
(58) Field of Classification Search
USPC .......................................................... 370/480
See application file for complete search history.

(56) References Cited

U.S. PATENT DOCUMENTS

| | | |
|---|---|---|
| 6,353,490 B1 | 3/2002 | Singer et al. |
| 2005/0155082 A1* | 7/2005 | Weinstein et al. ............. 725/131 |
| 2009/0207936 A1* | 8/2009 | Behzad ......................... 375/296 |
| 2010/0150557 A1* | 6/2010 | Mysore et al. .................. 398/68 |

* cited by examiner

*Primary Examiner* — Mark Rinehart
*Assistant Examiner* — Christopher R Crompton
(74) *Attorney, Agent, or Firm* — Lori Anne D. Swanson

(57) ABSTRACT

A device for stacking signals in an expanded frequency range includes an upconverter and a multiplexer. The upconverter is configured to receive upstream signals that are in a first frequency range, upconvert some of the upstream signals that are in a first frequency sub-range of the first frequency range and pass some of the upstream signals that are in a second frequency sub-range of the first frequency range. The multiplexer is configured to stack the upconverted upstream signals and the upstream signals in the second frequency sub-range and output the stacked upstream signals.

12 Claims, 4 Drawing Sheets

FREQUENCY

SYSTEM FOR STACKING SIGNALS IN AN EXPANDED FREQUENCY RANGE

BACKGROUND

Hybrid fiber-coaxial (HFC) is a broadband network, which combines a fiber optic network and a coaxial cable network. The fiber optic network may extend from a cable operators' headend to a fiber optic node, which serves anywhere from 25 to 2000 customer premises. In downstream communication to customer premises, the headend may obtain downstream data via satellite dishes or other sources of information and optically transmit the downstream data over an optical fiber of the fiber optic network to a fiber optic node. The fiber optic node in turn converts the optical signals received from the headend into electrical signals and transmits the electrical signals to the customer premises via coaxial cables. In upstream communication from a customer premise to the fiber optic node, the customer premise sends upstream signals over a coaxial cable to the fiber optic node, which in turn converts the upstream signals into optical signals and transmits the optical signals to the headend.

In performing upstream communication from a customer premise to a fiber optic node over the coax, a frequency range between 5 mega hertz (MHz) and 42 MHz (or a frequency range between 5 MHz and 65 MHz in Europe or a frequency range between 5 MHz and 85 MHz as specified for DOCSIS 3.0 systems) has been generally allowed for the upstream communication. In performing downstream communication from a fiber optic node to customer premises over the coax, a frequency range with the lower end of 50 MHz and the upper end ranging from 750 MHz to 1000 MHz has been generally allowed for the downstream communication. Because the frequency range for upstream communication is bounded at the upper end by the downstream communication, the frequency range for upstream communication has not been expandable by merely increasing the size of the frequency range. Thus, in upstream communication via a common coaxial cable line connected to a plurality of customer premises, if a bigger data-handling capacity was required by the customer premises than the data-handling capacity warranted by the coaxial cable line(s) through the upstream bandwidth between 5 MHz and 42 MHz, conventional methods required either logically splitting the fiber node (i.e. multiplexing multiple upstreams on the fiber return path by TDM, FDM, or WDM methods) or an installation of additional coaxial cable lines or an extension of the fiber optic node closer to the customer premises. However, both methods have been costly to implement. Further, while logically splitting the fiber node may solve an equally split node problem, it does not solve an unbalanced node problem.

Thus, a system for stacking signals in an expanded frequency range to transmit additional upstream signals through a coaxial cable line where logically splitting a fiber node may not provide benefit and without necessarily having to install additional coaxial cable lines or extend a fiber optic network closer to customer premises may be useful.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

As referred to in this disclosure, upconverting a signal is to change a frequency or a frequency range of the signal to a higher frequency or a higher frequency range, respectively.

According an embodiment, a system for stacking signals in an expanded frequency range includes a frequency stacker to stack upstream signals received from customer premises that are in a first frequency range in different frequency ranges and output the stacked upstream signals. The system also includes a fiber optic node to transmit the stacked upstream signals optically via an optical fiber. The fiber optic node is located at a different equipment site than an equipment site of the frequency stacker. In the system according to an embodiment of the invention, an amplifier may be arranged between the frequency stacker and the fiber optic node, wherein the amplifier is connected to the fiber optic node through a coaxial cable line.

By stacking upstream signals from customer premises in an expanded frequency range, that includes frequency ranges above a frequency range allocated for downstream communication, existing coaxial cable lines may be used for expanding upstream communication without necessarily having to install additional coaxial cable lines or extend a fiber optic network closer to the customer premises.

Figure 1:
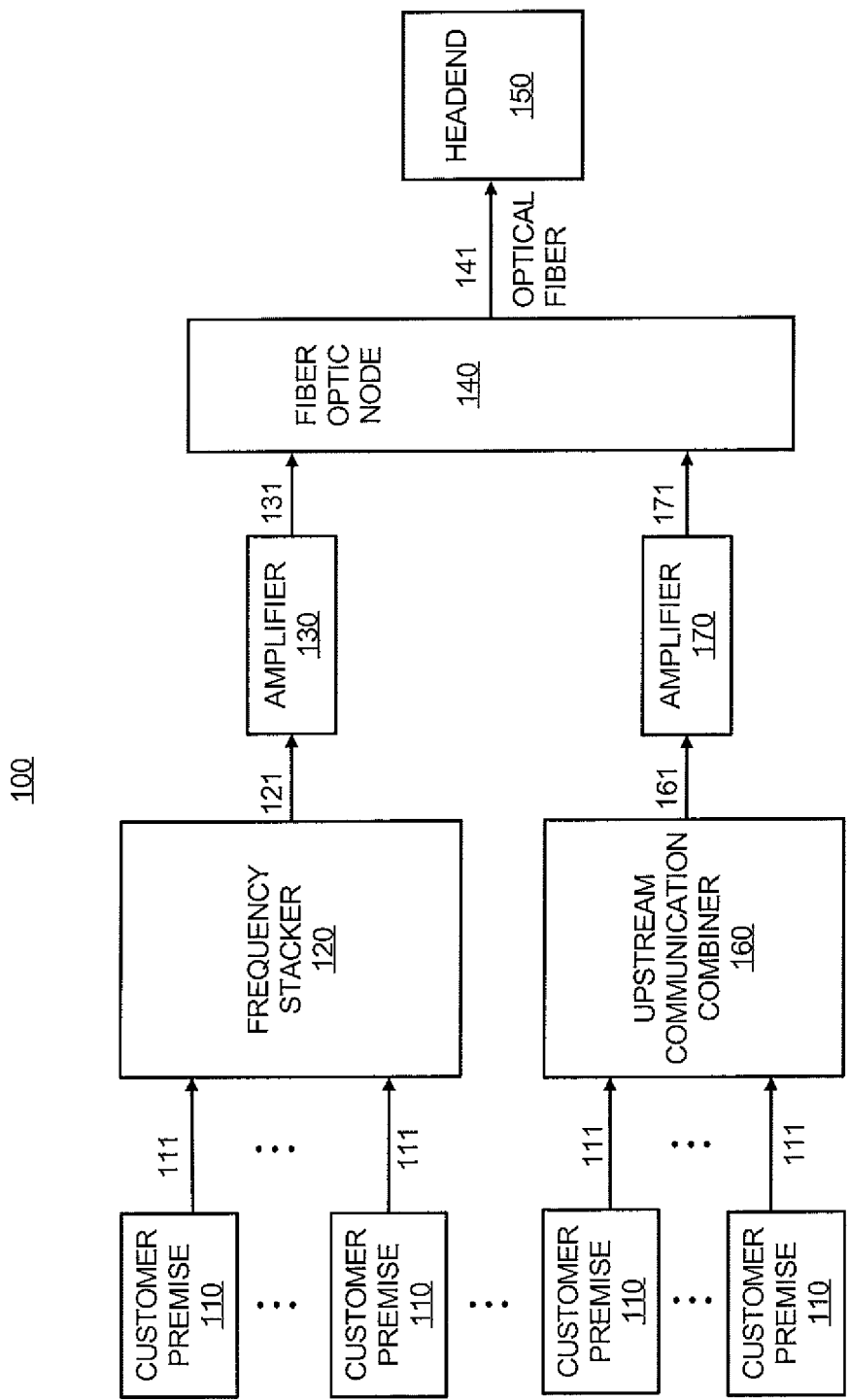
FIG. 1 illustrates a system for stacking signals in an expanded frequency range according to an embodiment of the invention.

Turning now to FIG. 1, shown therein is a system 100 for stacking signals in an expanded frequency range according to an embodiment of the invention. It should be understood that the system 100 may include additional components and that some of the components described herein may be removed and/or modified without departing from a scope of the system 100. While the system 100 will be explained below in connection with upstream communication, some components within the system 100 may also be used for downstream communication. Further, while the system 100 will be explained below in connection with a system having a frequency range for upstream communication bounded at the upper end by a frequency range for downstream communication, the same description also applies to other systems with different frequency range arrangements as long as an expanded frequency range for transmitting upstream signals is useful. For example, a frequency range of upstream communication received from customer premises may already be in a frequency range higher than the frequency range for downstream communication. Such a higher frequency range of upstream communication received from customer premises may be generated by the customer premises themselves or through another frequency stacker not shown in the system 100 for stacking upstream communication from the customer premises into the higher frequency range. In such cases, a frequency stacker 120 of the system 100 may upconvert the upstream communication in the higher frequency range to yet higher frequency ranges or may pass the upstream communication in the higher frequency range without an upconversion by the frequency stacker 120.

In describing the system 100 more specifically, the system 100 includes customer premises 110, the frequency stacker 120, an amplifier 130, a fiber optic node 140, a headend 150, an optical fiber 141, and coaxial cable lines 111, 121, 131, 161 and 171. While the coaxial cable lines 111, 121, 131, 161 and 171 are shown for transmitting signals between respective components, any other reasonably suitable types of communication lines, such as twisted pairs, optical fiber, Ethernet, etc., may also be used instead of the coaxial cable lines 111, 121, 131, 161 and 171.

The customer premises 110 may each be any reasonably suitable premise having one or more customer premise equipment (CPE) devices that communicates with the frequency stacker 120 via a coaxial cable line 111. While a single coaxial cable line 111 is shown for transmitting upstream signals from each customer premise 110, a plurality of coaxial cable lines may also be used in transmitting the upstream signals from the customer premise 110. For example, different coaxial cable lines 111 may be used for different CPE devices of the customer premise 110, respectively. In performing the upstream communication, each customer premise 110 may transmit upstream signals having a frequency range between 5 MHz and 42 MHz. Alternatively, as described above, upstream signals from the customer premises 110 may be in a frequency range higher than a frequency range of downstream communication (for example, a frequency range with the lower end at 50 MHz and the upper end ranging from 750 MHz to 1000 MHz) by generating the higher frequency upstream signals with the customer premises 110 themselves or with another frequency stacker placed between the customer premises 110 and the frequency stacker 120.

The frequency stacker 120 may be any reasonably suitable device for receiving upstream signals from the customer premises 110, stacking the upstream signals in a plurality of frequency ranges, and outputting the stacked upstream signals via the coaxial cable line 121. After receiving the upstream signals transmitted through the coaxial cable lines 111, the frequency stacker 120 filters out any noise in unwanted frequency ranges, amplifies the filtered upstream signals, stacks the filtered upstream signals in different frequency ranges, and outputs the stacked upstream signals. The frequency stacker 120 is placed at a different equipment site than the equipment site of the fiber optic node 140. For example, the frequency stacker 120 may be located at an equipment site such as a telephone pole, which is distanced from the equipment site for the fiber optic node 140 by, for example, at least 50, 100, or 1000 yards.

In stacking the filtered upstream signals, the frequency stacker 120 may upconvert the filtered upstream signals from at least one group of customer premises 110 into one or more frequency ranges higher than the frequency range for downstream communication that does not overlap with a frequency range for upstream communication between 5 MHz and 42 MHz. The upconverted upstream signals are stacked, in an expanded frequency range for upstream communication including the frequency range between 5 MHz and 42 MHz and the upconverted frequency ranges, with the filtered upstream signals from a second group of customer premises 110 that are not converted into higher frequency ranges by the frequency stacker 120 and have a frequency range between 5 MHz and 42 MHz. If the frequency stacker 120 receives filtered upstream signals that are already in a higher frequency range (for example, a frequency range higher than the frequency range for downstream communication), the frequency stacker 120 may upconvert the received upstream signal in the higher frequency range to yet higher frequency ranges or may pass the received upstream signal in the higher frequency range without an upconversion by the frequency stacker 120.

Further, since a sub-range between 5 MHz and 15 MHz of the frequency range between 5 MHz and 42 MHz is noisier than the rest of the frequency range, upconverters of the frequency stacker 120 may selectively upconvert upstream signals having a frequency sub-range between, for example, 15 MHz and 42 MHz and pass upstream signals having a frequency sub-range between, for example, 5 MHz and 15 MHz without performing the upconversion. Further, since some customer premises may support extended frequencies such as DOCSIS 3.0 support for 5 MHz to 85 MHz, the frequency stacker 120 may selectively upconvert upstream signals with an extended frequency range. While only one frequency stacker 120 is shown, there may be multiple frequency stackers 120, where each frequency stacker 120 stacks upstream signals from a respective group of customer premises 110 in a plurality of frequency ranges and outputs the stacked upstream signals through a respective coaxial cable line 121 and a respective amplifier 130 to the fiber optic node 140. In addition to selectively stacking or passing upstream signals in different frequency ranges, respectively, and transmitting the stacked upstream signals to the optical fiber 141, the frequency stacker 120 may receive upstream signals from a group of customer premises 110 and transmit, with or without stacking the upstream signals as discussed above, the upstream signals to the fiber optic node 140 or the headend 150 through a wireless communication channel.

The amplifier 130 may be any reasonably suitable amplifier for amplifying stacked upstream signals received from the frequency stacker 120 and transmitting the amplified upstream signals to the fiber optic node 140. For example, the amplifier 130 may be a triplexed amplifier for separately amplifying downstream signals from the fiber optic node 140 that have a frequency range with the lower end at 50 MHz and the upper end ranging from 750 MHz to 1000 MHz, amplifying upstream signals having a frequency range between 5 Hz and 42 MHz, and amplifying upconverted upstream signals having frequency ranges above the frequency range for downstream communication. In communicating upstream signals over a long distance, the amplifier 130 may be useful in strengthening the upstream signals and compensating for any signal attenuation. The amplifier 130 may be located at an equipment site such as a telephone pole, which is distanced from the equipment sites for the frequency stacker 120 and the fiber optic node 140 by, for example, at least 50, 100, or 1000 yards.

The fiber optic node 140 may be any reasonably suitable device for converting upstream electrical signals received from customer premises 110 into optical signals and transmitting the optical signals via the optical fiber 141. The fiber optic node 140 destacks the stacked upstream signals received from the frequency stacker 120 in generating optical signals representative of the upstream signals. Alternatively, the fiber optic node 140 may not destack the stacked upstream signals received from the frequency stacker 120 and the headend 150 may perform the destacking of the stacked upstream signals. The fiber optic node 140 converts the stacked upstream signals received from the frequency stacker 120 with or without the above-described destacking into optical signals and transmits the optical signals to the headend 150. The fiber optic node 140 also receives upstream signals from the upstream communication combiner 160, which are amplified by the amplifier 170, converts the upstream signals into optical signals, and outputs the optical signals through the optical fiber 141. In optically transmitting upstream signals received by the fiber optic node 140, the upstream signals received by the fiber optic node 140 may be transmitted with or without the above-described destacking by the fiber optic node 140 by a laser of the fiber optic node 140 or by a laser of a multiplexer for wavelength division multiplexing (WMD), which may be a separate structure from the fiber optic node 140. While only one optical fiber 141 is shown, a plurality of optical fibers 141 may be used to transmit upstream signals received by the fiber optic node 140 to the headend 150.

The headend 150 may be any reasonably suitable headend for receiving from the optical fiber 141 optical signals corresponding to upstream signals received by the fiber optic node 140 and processing the received optical signals as upstream communication from corresponding customer premises 110.

The upstream communication combiner 160 may be any reasonably suitable device for combining upstream signals received from a group of customer premises 110 and outputting the combined upstream signals to the coaxial communication line 161. The upstream communication combiner 160 does not upconvert the received upstream signals into a higher frequency, and thus the combined upstream signals have the same frequency range as the frequency range of the received upstream signals (that is, a frequency range between 5 MHz and 42 MHz).

The amplifier 170 receives the combined upstream signals from the upstream communication combiner 160, amplifies the combined upstream signals, and outputs the amplified upstream signals to the coaxial cable line 171. In communicating upstream signals over a long distance, the amplifier 170 is useful in strengthening upstream signals and compensating for any signal attenuation. The amplifier 170 may be located at an equipment site such as a telephone pole, which is distanced from the equipment sites for the upstream communication combiner 160 and the fiber optic node 140 by, for example, at least 50, 100, or 1000 yards.

Figure 2:
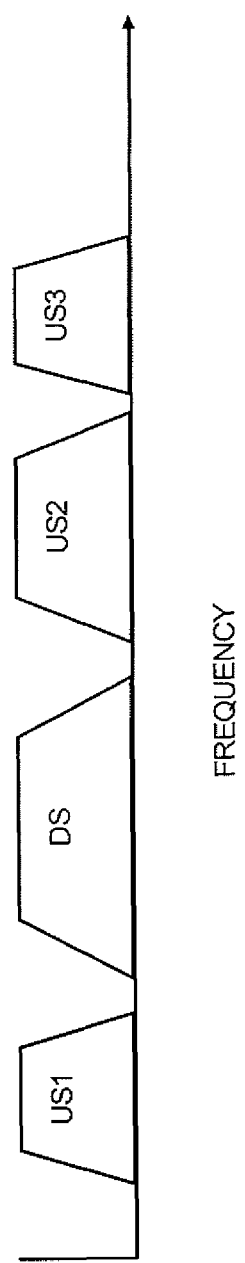
FIG. 2 illustrates a graph showing a plurality of frequency ranges for upstream and downstream communication according to an embodiment of the invention.

Turning now to FIG. 2, shown therein is a graph showing a plurality of frequency ranges for upstream and downstream communication according to an embodiment of the invention. US1 is a first frequency range for upstream communication from the customer premises 110 to the fiber optic node 140 and is between 5 MHz and 42 MHz. DS is a frequency range allocated for communicating downstream signals from the fiber optic node 140 to the customer premises 110, where the frequency range has the lower end of 50 MHz and the upper end ranging between 750 MHz and 1000 MHz. US2 is arranged above DS and is allocated for communicating upstream signals from a group of customer premises 110 that are upconverted into the US2 frequency range. US3 is arranged above US2 and is allocated for communicating upstream signals from another group of customer premises 110 that are upconverted into the US3 frequency range. Additional frequency ranges for upstream communication may also be arranged above US3 and may be allocated for communicating upstream signals from additional groups of customer premises 110 that are upconverted into the additional frequency ranges.

Figure 3:
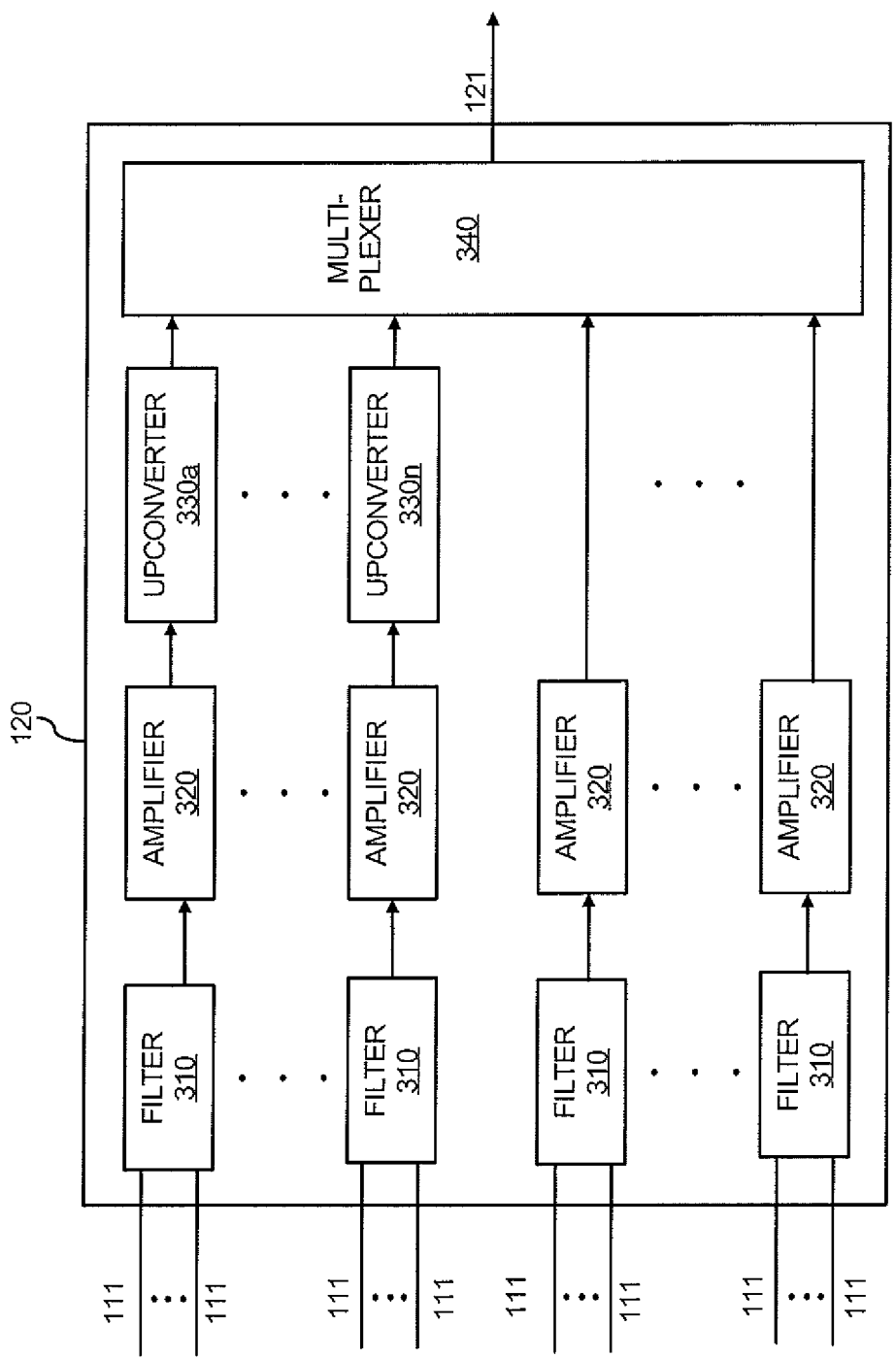
FIG. 3 illustrates a frequency stacker for stacking upstream signals in different frequency ranges and outputting the stacked upstream signals according to an embodiment of the invention.

Turning now to FIG. 3, shown therein is the frequency stacker 120 for stacking upstream signals in different frequency ranges and outputting the stacked upstream signals according to an embodiment of the invention. It should be understood that the frequency stacker 120 may include additional components and that some of the components described herein may be removed and/or modified without departing from a scope of the frequency stacker 120.

In describing the frequency stacker 120 more specifically, the frequency stacker 120 includes filters 310, amplifiers 320, upconverters 330a-330n, and a multiplexer 340.

Each filter 310 is coupled to receive upstream signals from a group of customer premises 110 via coaxial cable lines 111. The number of customer premises 110 coupled to each filter 310 may vary from one to another. Each filter 310 may be a bandpass filter for filtering out any noise in unwanted frequency ranges such as frequency components outside a frequency range between 5 MHz and 42 MHz or frequency components outside a higher frequency range if the upstream signals from respective customer premises 110 are already in the higher frequency range.

An amplifier 320 is coupled to receive filtered upstream signals from a respective filter 310. The amplifier 320 amplifies the filtered upstream signals by an appropriate signal amplification factor and outputs the amplified upstream signals.

The upconverters 330a-330n are each coupled to a respective amplifier 320 for receiving amplified upstream signals that are in a first frequency sub-range of a upstream communication frequency range (for example, a frequency sub-range between 15 MHz and 42 MHz) and upconverting the amplified upstream signals in the first frequency sub-range into a frequency range higher than DS. The upconverters 330a-330n may each receive and pass, without performing an upconversion into a higher frequency range, amplified upstream signals that are in a second frequency of the upstream communication frequency range (for example, a frequency sub-range between 5 MHz and 15 MHz) or amplified upstream signals that are in a frequency range higher than the downstream communication frequency range. Alternatively, as described above, the upconverters 330a-330n may each upconvert the received amplified upstream signals that are in a frequency range higher than the frequency range between 5 MHz and 42 MHz into yet higher frequency ranges. The upconverters 330a-330n may each be any reasonably suitable device for upconverting upstream signals to a frequency range higher than DS. For example, the upconverters 330a-330n may each be a multiplier for multiplying upstream signals by a local oscillator frequency, where the multiplication shifts up the frequency range of the upstream signals by the magnitude of the local oscillator frequency. The upconverters 330a-330n may each upconvert amplified upstream signals into a separate frequency range. Alternatively, one or more upconverters 330a-330n may upconvert their respective amplified upstream signals into a same frequency range. The size of a frequency range allocated for communicating upstream signals of one or more upconverters 330a-330n may depend on a total number of customer premises 110 allocated to the frequency range via, for example, assigning a same local oscillator frequency to one or more upconverters 330a-330n. For instance, a smaller one of the different frequency ranges in bandwidth size has a smaller number of customer premises 110 assigned for communicating upstream signals through the smaller frequency range than a number of customer premises assigned for communicating upstream signals through a larger one of the different frequency ranges in bandwidth size.

The multiplexer 340 receives from the upconverters 330a-n the upconverted upstream signals and upstream signals that are not upconverted by the upconverters 330-n. The multiplexer 340 also receives amplified upstream signals from one or more amplifiers 320 that are not passed through the upconverters 330a-n but are in a higher frequency range (for example, a frequency range above a frequency range for downstream communication) when received by the multiplexer 340. The amplified upstream signals received by the multiplexer 340 that are not passed through the upconverters 330a-n and the upstream signals from the upconverters 330a-n are multiplexed/stacked by the multiplexer 340 into upstream signals having the different frequency bands. The stacked upstream signals are outputted by the multiplexer on the coaxial cable line 121.

Figure 4:
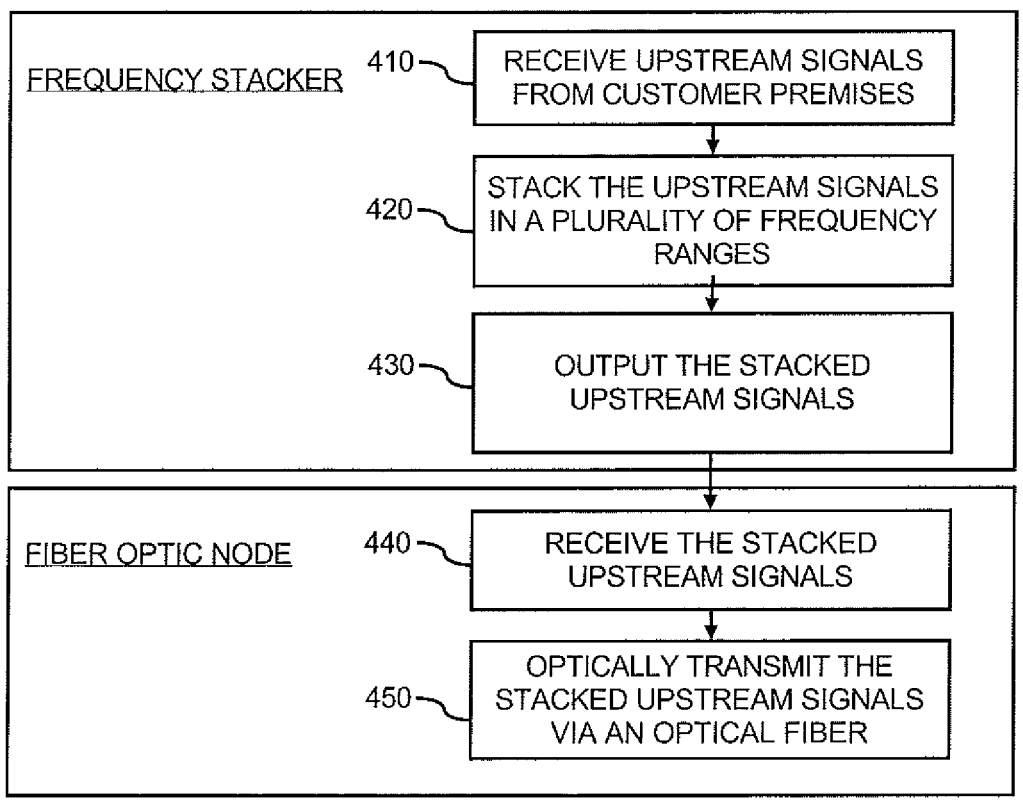
FIG. 4 illustrates a method for stacking upstream signals in an expanded frequency range according to an embodiment of the invention.

Turning now to FIG. 4, shown therein is a method 400 for stacking upstream signals in an expanded frequency range according to an embodiment of the invention. It should be apparent to those of ordinary skill in the art that other steps may be added or existing steps may be removed, modified or rearranged without departing from a scope of the method 400.

At step 410, the frequency stacker 120 receives upstream signals from a plurality of customer premises 110 that are in a first frequency range.

At step 420, the frequency stacker 120 stacks the upstream signals from the customer premises 110 in a plurality of frequency ranges.

At step 430, the frequency stacker 120 outputs the stacked upstream signals.

At step 440, the fiber optic node 140 receives the stacked upstream signals.

At step 450, the fiber optic node 140 optically transmits the stacked upstream signals via the optical fiber 150.

Any one or more of the above-described operations of the system 100 and frequency stacker 120 in reference to exemplary features and embodiments of FIGS. 1-4 may be contained as a computer program product embodied on one or more tangible computer readable storage mediums. The computer program product may exist in a variety of forms both active and inactive. For instance, the computer program product may exist as software program(s) comprised of program instructions in source code, object code, executable code or other formats whether compressed or uncompressed. Exemplary tangible computer readable storage mediums include conventional computer system RAM, ROM, EPROM, EEPROM, and magnetic or optical disks or tapes.

While exemplary features and embodiments of FIGS. 1-4 have been explained within the context of each feature and embodiment, any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A device for stacking signals in an expanded frequency range for transmitting upstream signals, the device comprising:
    an upconverter configured to:
        receive upstream signals from each of a plurality of coaxial lines in a hybrid fiber-coaxial (HFC) network that are in a first frequency range;
        upconvert a first group of the upstream signals from the first frequency range to one or more upconverted frequency ranges,
        wherein the one or more upconverted frequency ranges are higher than the first frequency range and higher than a downstream frequency range used for downstream communication,
        wherein a first upconverted frequency range of the one or more upconverted frequency ranges is different in bandwidth size from a second upconverted frequency range of the one or more upconverted frequency ranges, the first upconverted frequency range having a bandwidth size for communicating with a smaller number of allocated customer premises than a number of customer premises allocated to the second upconverted frequency range,
        pass a second group of the upstream signals that are in the first frequency range without performing the upconversion to the one or more upconverted frequency ranges, wherein the first frequency range is lower than said downstream frequency range used for downstream communication;
    a multiplexer configured to:
        stack, in the expanded frequency range, the upconverted first group of upstream signals and the second group of upstream signals, and
        output the stacked upstream signals.

2. The device of claim 1, wherein the device includes:
    a filter configured to receive and filter out noise from upstream signals from a second plurality of customer premises; and
    an amplifier configured to amplify the filtered upstream signals, wherein the multiplexer is configured to receive the amplified upstream signals without upconverting the amplified upstream signals in the device and stack the amplified upstream signals as a part of the stacked upstream signals.

3. The device of claim 2, wherein the upstream signals from the second plurality of customer premises are in a frequency range higher than the first frequency range.

4. The device of claim 1, wherein the second frequency sub-range is lower in frequency than the first frequency sub-range.

5. A method for stacking signals in an expanded frequency range, the method comprising:
    receiving upstream signals from each of a plurality of coaxial lines in a hybrid fiber-coaxial (HFC) network that are in a first frequency range;
    upconverting a first group of the upstream coaxial signals from the first frequency range to one or more upconverted frequency ranges, wherein the one or more upconverted frequency ranges is higher than the first frequency range, and higher than a downstream frequency range used for downstream communication,
    wherein a first upconverted frequency range of the one or more upconverted frequency ranges is different in bandwidth size from a second upconverted frequency range of the one or more upconverted frequency ranges, the first upconverted frequency range having a bandwidth size for communicating with a smaller number of allocated customer premises than a number of customer premises allocated to the second upconverted frequency range,
    passing a second group of the upstream coaxial signals that are in the first frequency range without performing the upconversion to the one or more upconverted frequency ranges, wherein the first frequency range is lower than said downstream frequency range used for downstream communication;

stacking, in the expanded frequency range, the upconverted first group of upstream signals and the second group of upstream signals; and outputting the stacked upstream signals.

6. The method of claim 5, further comprising:

receiving and filtering out noise from upstream signals from a second plurality of customer premises; and amplifying the filtered upstream signals without upconverting the amplified upstream signals; and stacking, in the expanded frequency band, the amplified upstream signals as a part of the stacked upstream signals.

7. The method of claim 6, wherein the upstream signals from the second plurality of customer premises are in a frequency range higher than the first frequency range.

8. The method of claim 5, wherein the second frequency sub-range is lower in frequency than the first frequency sub-range.

9. A computer program product embodied on one or more non-transitory computer readable storage mediums for stacking signals in an expanded frequency range, the computer program product comprising instructions, that when executed by a processor, cause the processor to perform:

receiving upstream signals from each of a plurality of coaxial lines in a hybrid fiber-coaxial (HFC) network that are in a first frequency range;

upconverting a first group of the upstream coaxial signals from the first frequency range to one or more upconverted frequency ranges, wherein the one or more upconverted frequency ranges is higher than the first frequency range, and higher than a downstream frequency range used for downstream communication, wherein a first upconverted frequency range of the one or more upconverted frequency ranges is different in bandwidth size from a second upconverted frequency range of the one or more upconverted frequency ranges, the first upconverted frequency range having a bandwidth size for communicating with a smaller number of allocated customer premises than a number of customer premises allocated to the second upconverted frequency range, passing a second group of the upstream coaxial signals that are in the first frequency range without performing the upconversion to the one or more upconverted frequency ranges, wherein the first frequency range is lower than said downstream frequency range used for downstream communication;

stacking, in the expanded frequency range, the upconverted first group of upstream signals and the second group of upstream signals; and outputting the stacked upstream signals.

10. The computer program product claim 9, further comprising instructions for:

receiving and filtering out noise from upstream signals from a second plurality of customer premises; and amplifying the filtered upstream signals without upconverting the amplified upstream signals; and stacking, in the expanded frequency band, the amplified upstream signals as a part of the stacked upstream signals.

11. The computer program product claim 10, wherein the upstream signals from the second plurality of customer premises are in a frequency range higher than the first frequency range.

12. The computer program product claim 9, wherein the second frequency sub-range is lower in frequency than the first frequency sub-range.

\* \* \* \* \*